(12) United States Patent
Daniel

(10) Patent No.: US 10,899,637 B2
(45) Date of Patent: Jan. 26, 2021

(54) METHOD FOR THE DESALINATION OF SUPERSATURATED HOT WATER

(71) Applicant: SUEZ INTERNATIONAL, Paris la Defense (FR)

(72) Inventor: Loic Daniel, Rueil Malmaison (FR)

(73) Assignee: SUEZ INTERNATIONAL, Paris la Defense (FR)

( * ) Notice: Subject to any disclaimer, the term of this patent is extended or adjusted under 35 U.S.C. 154(b) by 303 days.

(21) Appl. No.: 15/508,144

(22) PCT Filed: Sep. 2, 2015

(86) PCT No.: PCT/IB2015/056663
§ 371 (c)(1),
(2) Date: Mar. 2, 2017

(87) PCT Pub. No.: WO2016/035024
PCT Pub. Date: Mar. 10, 2016

(65) Prior Publication Data
US 2017/0283280 A1    Oct. 5, 2017

(30) Foreign Application Priority Data

Sep. 2, 2014    (FR) ..................................... 14 58186

(51) Int. Cl.
B01D 61/02    (2006.01)
B01D 61/04    (2006.01)
(Continued)

(52) U.S. Cl.
CPC ............ C02F 1/441 (2013.01); B01D 61/025 (2013.01); C02F 5/00 (2013.01); C02F 5/08 (2013.01);
(Continued)

(58) Field of Classification Search
CPC ........ C02F 1/441; C02F 2103/06; C02F 5/00; C02F 5/025; C02F 5/08; C02F 2101/203;
(Continued)

(56) References Cited

U.S. PATENT DOCUMENTS

2006/0157409 A1*  7/2006  Hassan ................ B01D 61/022
                                                                    210/637
2009/0001020 A1*  1/2009  Constantz ................ C02F 1/66
                                                                    210/652
2009/0081105 A1*  3/2009  Bourcier ................ C01B 33/12
                                                                    423/339

FOREIGN PATENT DOCUMENTS

DE    102007024424    11/2008
DE    102012112215    6/2014

OTHER PUBLICATIONS

Mook, W., "Chemistry of carbonic acid in water", Environmental Isotopes in the Hydrological Cycle: Principles and Applications, INEA/UNESCO, pp. 143-165, § 9.5.3; archival copy https://web.archive.org/web/20110521161025/http://www-naweb.iaea.org/napc/ih/documents/global_cycle/vol%20 (Year: 2000).*

(Continued)

Primary Examiner — Angel Olivera
(74) Attorney, Agent, or Firm — Nixon & Vanderhye

(57) ABSTRACT

A method for desalination of hot supersaturated water having a temperature of between 40° C. and 80°, includes contacting the hot water with a reverse osmosis membrane which is resistant to temperatures of between 40 and 80° C. without a prior cooling step.

17 Claims, 1 Drawing Sheet

(51) Int. Cl.
- *C02F 1/44* (2006.01)
- *C02F 101/20* (2006.01)
- *C02F 103/06* (2006.01)
- *C02F 103/08* (2006.01)
- *C02F 5/00* (2006.01)
- *C02F 5/08* (2006.01)
- *C02F 101/00* (2006.01)
- *C02F 5/02* (2006.01)

(52) U.S. Cl.
CPC .......... *B01D 61/04* (2013.01); *B01D 2311/04* (2013.01); *B01D 2311/06* (2013.01); *B01D 2311/103* (2013.01); *B01D 2311/106* (2013.01); *B01D 2311/268* (2013.01); *C02F 5/025* (2013.01); *C02F 2101/006* (2013.01); *C02F 2101/20* (2013.01); *C02F 2101/203* (2013.01); *C02F 2101/206* (2013.01); *C02F 2101/40* (2013.01); *C02F 2103/06* (2013.01); *C02F 2103/08* (2013.01); *Y02A 20/131* (2018.01)

(58) Field of Classification Search
CPC ............ C02F 2101/40; C02F 2101/206; C02F 2101/20; C02F 2103/08; C02F 2101/006; B01D 61/04; B01D 61/025; B01D 2311/103; B01D 2311/04; B01D 2311/06; B01D 2311/106; B01D 2311/268; Y02A 20/131

See application file for complete search history.

(56) References Cited

OTHER PUBLICATIONS

Lennetech.com, "Langelier Saturation Index Calculator", accessed on Mar. 28, 2020, available at https://www.lenntech.com/calculators/langelier/index/langelier.htm (applying the Langelier Saturation Index formula originally published in 1936) (Year: 2020).*

English Translation of the International Preliminary Report on the Patentability PCT/IB2015/056663 dated Nov. 4, 2015.

Boysen et al., "Hot water reverse osmosis in Goodyear, AZ", Water Quality Technology Conference and Exposition 2008; Nov. 16, 2008 to Nov. 20, 2008; Cincinnati, OH, USA, American Water Works Assoc, Denver, Colo., US, Jan. 1, 2008, pp. 2190-2201, XP008173273.

Snow et al., "New techniques for extreme conditions: high temperature reverse osmosis and nanofiltration", Desalination, Elsevier, Amsterdam, NL, vol. 105, No. 1, Jun. 1, 1996, pp. 57-61, XP004018987.

* cited by examiner

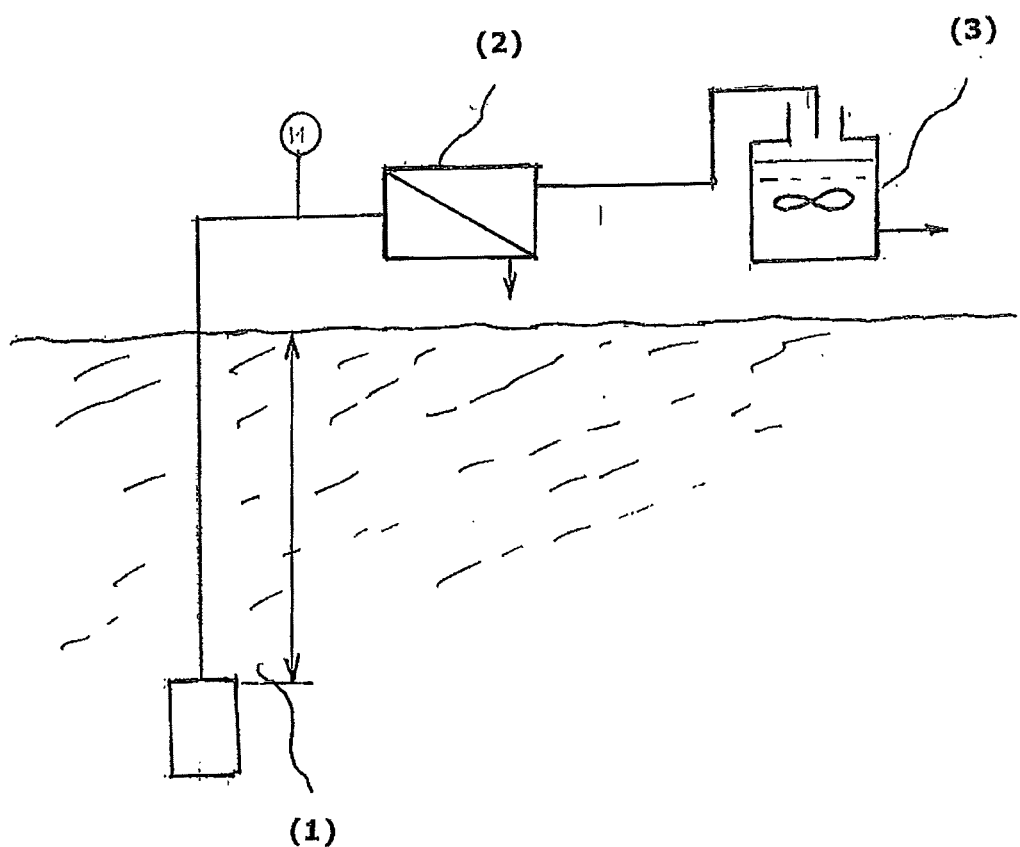

METHOD FOR THE DESALINATION OF SUPERSATURATED HOT WATER

The present invention pertains to a method for desalination by reverse osmosis of hot supersaturated water.

Reverse osmosis is one of the most widely used methods for preparing potable water from surface or sub surface water, especially from marine salt water.

Accordingly there are a number of plants in existence for treating such hot supersaturated water with reverse osmosis, particularly in Saudi Arabia. All of these plants have until now been designed according to the succession of steps below:

1. groundwater pumping,
2. cooling-tower cooling to lower the temperature of the water to a level which the reverse osmosis membranes can accept,
3. optionally a complementary step combining decarbonatation and/or softening and/or desilication and/or iron removal, to enhance the reverse osmosis yield,
4. subsequently a one- or two-stage filtration step, to retain the finer particles which would risk clogging the reverse osmosis membranes,
5. injection of a chemical reagent called a sequestrant, to enhance the reverse osmosis yield,
6. a cartridge filter step with a nominal cutoff of 5 to 10 micrometres (though possibly above or below this range, depending on the design choices), this step acting to protect against accidental arrival of suspended matter,
7. lastly the reverse osmosis step, desalinating the water to the level required for its intended use.

It is of course possible to use heat exchangers without loss of $CO_2$, but such apparatus is found to be much more expensive than open cooling towers which take off some of the water for treatment, to produce the desired cooling and therefore become economically unviable when the flow for treatment is greater than a few $m^3/h$.

In order to limit or prevent precipitation of carbonate, an operation sometimes carried out is the injection of an acid and/or a sequestrant upstream of the cooling towers, the same sequestrant and acids sometimes, as a complement, also being injected upstream of the filtration. In both cases, the objective of adding such reagents is to lower the precipitation potential in the course of traversal of the cooling towers and the filters, and so to protect these items of equipment against the harmful accumulation of material.

These solutions, however, have great drawbacks, associated with the precipitation of certain ions which are present in this hot water.

The reason is that this water is of sub surface origin, originating in particular from aquifers contained in groundwater compartments. These natural waters are brackish and may contain considerable quantities of suspended matter.

Moreover, this hot water (>40-45° C.) arriving at the cooling towers has come from deep groundwater and therefore usually has a low pH (generally of lower than 7.5) and therefore a variable, but high, $CO_2$ content, by comparison with natural surface waters. Moreover, this water contains variable but significant levels of calcium ion ($Ca^{2+}$) and bicarbonate ion ($HCO_3^-$). Like all natural waters, this water therefore conforms to the so-called calco-carbonic balance which governs the equilibria between $Ca^{2+}$, $HCO_3^-$, $CO_3^{2-}$, $H^+$ and $OH^-$ ions and also the species $CO_2$ and $CaCO_3$, in accordance with known equilibrium laws each of which is governed by a constant and which may be represented by the simplified equations below:

$$CO_2 + OH^- \iff HCO_3^- \quad [1]$$

$$HCO_3^- \iff H^+ + CO_3^{2-} \quad [2]$$

$$Ca^{2+} + CO_3^{2-} \iff CaCO_3 \quad [3]$$

Consequently, during traversal of the cooling tower, the loss of $CO_2$ causes a rise in pH, which then exceeds the equilibrium pH. In order to restore equilibrium under these new conditions, the water will tend to produce carbonate ions $CO_3^{2-}$ from the bicarbonate ions $HCO_3^-$ as per [2]. This additional carbonate, however, then gives rise to a shift in the equilibrium [3] towards the appearance of calcium carbonate $CaCO_3$, which is insoluble and therefore undergoes precipitation.

Furthermore, the addition of oxygen to this water, which is lacking in oxygen, gives rise to the oxidation and rapid precipitation of the iron, generally present in a variable amount, possibly up to several mg/l. If the iron were to precipitate on its own, it would to a large extent be washed out by the water in the tower; however, when the calcium carbonate precipitates, the iron precipitate tends to join with it, thereby further increasing the clogging load in the cooling tower.

The precipitation and accumulation of precipitates in the exchange structure of the cooling tower give rise to two major drawbacks:

1. the structure becomes heavier, this being the most serious consequence; the structure may even break if it is not cleaned on time. This periodic cleaning reduces the availability of the system.
2. a loss of cooling yield, which may necessitate a reduction in the plant throughput.

The precipitation and accumulation of precipitates in the filter lead to the following:

1. blocking of moving equipment items (valves, pumps),
2. solidification of the filtering material, thereby compromising its filtration activity and its daily automated washing, and
3. accumulation of clogging matter, thereby reducing the cycle duration and degrading the quality of the water directed to the reverse osmosis unit.

Acidification upstream of the tower is sometimes used in order to reduce the bicarbonate initially present and therefore the potential for formation of carbonate. However, with water typically containing 3 milliequivalents of bicarbonate, this represents possible hydrochloric acid consumption of up to 110 mg/l of HCl, or almost 300 mg/l of commercial 38% strength acid, and this represents a significant operating cost and also storage difficulties. Furthermore, the conversion (recovery) of the downstream reverse osmosis system does not benefit very greatly from this removal, since the level of calcium is not lessened and the risk of precipitation by calcium sulfate therefore remains the limiting factor for the reverse osmosis recovery.

Sometimes a sequestrant product is also used, and will limit or delay precipitation in the cooling tower. This product, though, is quite expensive, its application at this site is still empirical, and it may have detrimental side effects in terms of the filtration, by degrading the efficiency with which suspended matter is removed from the filter. It is also possible for the sequestrant product to lose its efficacy on contact with the exchange mass in the cooling tower or with the filtration mass in the filter, and this may cause subsequent precipitation that are harmful to these systems.

Therefore, major drawbacks of the methods hitherto employed are:

1. a substantial risk of precipitation of calcium carbonate and iron in the cooling tower and in the subsequent filtration step,
2. a loss of cooling yield of the tower owing to the accumulated precipitates,
3. a sharp rise in the maintenance frequency for the cooling tower, giving rise to accelerated tower wear and loss of availability,
4. a risk of mechanical damage to the cooling tower if maintenance is not carried out in time,
5. a loss of performance of the filtration step owing to the precipitates accumulated over the course of a cycle,
6. a risk of solidification of the filtering medium, of blockage of the valves of the filter, and of clogging and inactivation of the filter sensors,
7. increased risks of contamination of the reverse osmosis membrane, and
8. a high cost owing to the reagents used to limit or eliminate precipitation.

There is therefore a need for a method which is able to reduce or even prevent the precipitation and the accumulation of precipitates in the exchange structure of the cooling tower and in the filter.

The inventors have now found that by omitting the step of cooling before the reverse osmosis, the risks of precipitation are greatly diminished, or even eliminated.

Accordingly, the subject of the present invention is a method for desalination of hot supersaturated water having a temperature of between 40° C. and 80° C., advantageously between 40 and 60° C., comprising contacting said hot water with a reverse osmosis membrane which is resistant to temperatures of between 40 and 80° C. without a prior cooling step.

For the purposes of the present invention, "hot supersaturated water" refers to water of sub surface origin, coming in particular from aquifers contained in groundwater compartments, and having the following principal characteristics:
- a temperature of greater than 35° C., preferably of between 40° C. and 80° C.,
- a brackish nature, meaning that the sum total of ions selected from the list calcium, magnesium, sodium, potassium, carbonates, bicarbonates, chlorides, sulfates or a mixture thereof is greater than 500 mg/l, and
- a high $CO_2$ content, giving it an equilibrium pH of less than 7.5 and preferably less than 7.

This water may optionally further comprise the compounds selected from the list:
- an iron content greater than 50 µg/l,
- a manganese content greater than 25 µg/l,
- a silica content greater than 10 mg/l,
- sulfur in colloidal form or in the form of hydrogen sulfide, in an amount greater than 10 µg/l,
- one or more radionuclides, such as radium or uranium, such that the overall alpha activity is greater than 0.5 Bq/l, or
- a mixture of thereof, at high levels.

By way of example, a hot supersaturated water which is brackish in nature may have the following characteristics:

| | |
|---|---|
| Temperature = | 60° C. |
| Calcium = | 360 mg/l |
| $CO_2$ = | 60 mg/l |
| pH = | 6.7 |
| $HCO_3$ = | 190 mg/l |
| Iron = | 3 mg/l |
| Manganese = | 200 µg/l |

-continued

| | |
|---|---|
| Silica = | 15 mg/l |
| Overall alpha activity ≥ | 0.5 Bq/l |

The contacting of the hot water with the reverse osmosis membrane may take place by any technique known to the skilled person. For example, the water may be pumped and taken via conduits to the membrane.

In accordance with the invention, the reverse osmosis membranes employed in the method may be any reverse osmosis membrane which is resistant to temperatures of between 40 and 80° C., especially membranes based on polyamides and on polysulphone.

In one advantageous embodiment of the invention, the raw water drawn from the well is directed onto the reverse osmosis membrane without loss of head, in order to prevent loss of $CO_2$.

In one advantageous embodiment of the invention, the method comprises a step of cooling of the desalinated permeate from the reverse osmosis. Then there is no risk of precipitation, irrespective of the cooling technology.

In another advantageous embodiment of the invention, the method may include, prior to the contacting of the hot water with the reverse osmosis membrane, a step of removing suspended matter or a step of adding a sequestrant, or both. The step of removing suspended matter will be required when the raw water includes, or is at risk of including, suspended matter obtained from drilling, whereas the addition of a sequestrant enhances the yield of the reverse osmosis filtration step. A skilled person has the knowledge to select the required additional step or steps in the light of his or her general knowledge and in dependence on the types of water.

In another advantageous embodiment of the invention, if the pressure of the raw water is insufficient to ensure the performance levels desired on the part of the membranes, the hot water may be pressurized before being contacted with the reverse osmosis membrane, by any means known to the skilled person, in particular by using a pump.

In another embodiment, the cooling tower is positioned downstream of the reverse osmosis membrane, thereby reducing the operating costs associated with fouling of the cooling tower, and reducing capital costs, moreover, thanks to the positioning of the tower on the permeate line, the flow rate of which is lower than the feed flow rate.

Advantageously, if the hot water were to comprise radium, this embodiment allows for retention of the radionuclides, especially radium or uranium, on the reverse osmosis membrane.

This cooling of the permeate of the osmoser prevents contamination of the ambient air with radon, which is a highly volatile element obtained from the disintegration of radium 226.

Apart from these economical advantages, an arrangement of this kind has the advantage of removing the risk of contamination of the atmosphere with radon, since the element radium and the radon will be retained by the reverse osmosis membranes before passage of the permeate into the cooling tower.

With the method according to the invention, for a well water having the following characteristics:

| | |
|---|---|
| pH | 6.7 |
| bicarbonate | 190 mg/l $HCO_3^-$ |

-continued

| | |
|---|---|
| calcium | 130 mg/l $Ca^{2+}$ |
| $CO_2$ | 60 mg/l |
| temperature | 50° C. | the reverse osmosis will then be able to operate at a conversion of 75%, which is the same as that obtained with the current method described above, but for the same product water flow at the station outlet, the cooling tower will only have 75% of the size of the tower in the current method for the same recovery temperature.

For further illustration of the method of the present invention, a description of one embodiment is given below. It remains the case, of course, that this is only one example, without any limitative character at all. In the course of this description, reference is made to FIG. 1 of the attached drawings, which is a scheme illustrating the various steps of the method according to the invention.

The raw water drawn from the well (1) is immediately directed towards the reverse osmosis system (2), by means of a pump (not shown in the FIGURE), without breach of head, in order to prevent loss of CO2. The latter passes almost entirely through the membrane towards the permeate (product water side). Upstream of the reverse osmosis system, a manometer (M) measures the exit pressure of the raw water exiting the well. The permeate is then cooled to the desired temperature and taken to a storage tank (3), then transported to the site of use.

The method according to the invention finds its primary application in the treatment of deep natural water which is hot and exhibits a calcium carbonate supersaturation potential.

This method however may be applied for production:
of water intended for human consumption,
of water intended for supplying industrial processes, such as washing water, water involved in the production of the manufactured product, water intended for feeding boilers, etc., and
of water intended for irrigation.

Finally, this method may also be applied to the treatment of water resulting from an industrial manufacturing process which would bring a calcium carbonate supersaturation potential in a water of more than 40-45° C., if the aim is to recycle the water, recover components from it, or treat it prior to discharge.

Relative to the method used to date and as described above, the method according to the invention accumulates a number of advantages:
removal of the risk of precipitation in all the steps,
smaller-sized cooling tower for a given production rate, since only the production permeate is processed (the brine discharge can certainly be evacuated in hot form),
smaller-sized cooling tower owing to the reduced cooling required, linked only to the temperature required at the exit from the plant,
no risk of clogging of the cooling tower, and hence maximum availability and limited maintenance costs,
a filtration step upstream of the reverse osmosis is pointless, since there is no longer any suspended matter to be removed, making for a marked reduction in capital and operating costs. The step could simply be retained if suspended matter was suspected in the raw water obtained directly from drilling,
no chemical removal of bicarbonates (by dosing of acid) and no need to reduce the precipitation risk in the cooling tower and during the filtration step (by application of a sequestrant), making for marked economic savings in operation.

The invention claimed is:

1. Method for desalination of hot supersaturated water of subsurface origin having a temperature of between 40° C. and 80° C., comprising contacting said hot supersaturated water with a reverse osmosis membrane which is resistant to temperatures of between 40 and 80° C. without a prior cooling step, said hot supersaturated water having a $CO_2$ content conferring to said hot supersaturated water an equilibrium pH of less than 7.5 and said hot supersaturated water comprising compounds selected from the group consisting of calcium, magnesium, sodium, potassium, carbonates, bicarbonates, chlorides, sulfates and mixtures thereof, with a total amount of said compounds being at least 500 mg/l, said hot supersaturated water having a calcium content and a bicarbonate content, and wherein the calcium content, bicarbonate content and $CO_2$ content of the hot supersaturated water are such that cooling of said hot supersaturated water prior to reverse osmosis would result in precipitation of $CaCO_3$.

2. Method according to claim 1, further comprising a step of cooling of the desalinated permeate from the reverse osmosis.

3. Method according to claim 2, wherein the permeate is cooled to a temperature less than 45° C.

4. Method according to claim 2, further comprising, prior to the contacting of the hot water with the reverse osmosis membrane, a step of removing suspended matter or a step of adding a sequestrant, or both.

5. Method according to claim 2, wherein the hot water is pressurized before being contacted with the reverse osmosis membrane.

6. Method according to claim 2, wherein the hot supersaturated water further comprises compounds selected from iron, manganese, silica, sulfur or a mixture thereof.

7. Method according to claim 2, wherein the permeate is cooled to a temperature less than 40° C.

8. Method according to claim 1, further comprising, prior to the contacting of the hot water with the reverse osmosis membrane, a step of removing suspended matter or a step of adding a sequestrant, or both.

9. Method according to claim 8, wherein the hot water is pressurized before being contacted with the reverse osmosis membrane.

10. Method according to claim 8, wherein the hot supersaturated water further comprises compounds selected from iron, manganese, silica, sulfur or a mixture thereof.

11. Method according to claim 1, wherein the hot water is pressurized before being contacted with the reverse osmosis membrane.

12. Method according to claim 11, wherein the hot supersaturated water further comprises compounds selected from iron, manganese, silica, sulfur or a mixture thereof.

13. Method according to claim 1, wherein the hot supersaturated water further comprises compounds selected from iron, manganese, silica, sulfur or a mixture thereof.

14. Method according to claim 1, wherein the hot supersaturated water comprises radionuclides.

15. Method according to claim 1, wherein the permeate of said hot water is cooled following its osmosis membrane traversal.

16. The method according to claim 1, wherein said method is for preparing potable water from surface or subsurface water.

17. The method according to claim 1, wherein said method is for preparing potable water from marine salt water.

* * * * *